United States Patent [19]

Flinchbaugh

[11] Patent Number: 4,835,528
[45] Date of Patent: May 30, 1989

[54] CURSOR CONTROL SYSTEM

[75] Inventor: Bruce E. Flinchbaugh, Dallas, Tex.

[73] Assignee: Texas Instruments Incorporated, Dallas, Tex.

[21] Appl. No.: 99,655

[22] Filed: Sep. 21, 1987

Related U.S. Application Data

[63] Continuation of Ser. No. 814,854, Dec. 30, 1985, abandoned.

[51] Int. Cl.$^4$ .............................................. G06F 3/033
[52] U.S. Cl. .................................... 340/709; 340/710
[58] Field of Search ............... 340/709, 710, 706, 729, 340/747; 293/148 B; 178/18, 19, 20; 74/471 XY, 471 R

[56] References Cited

U.S. PATENT DOCUMENTS

| | | | |
|---|---|---|---|
| 3,643,148 | 2/1972 | Brown et al. | 340/710 |
| 3,731,299 | 5/1973 | Bouchard et al. | 340/709 |
| 3,833,861 | 5/1975 | Heartz | 340/709 |
| 4,328,491 | 5/1982 | Demetrescu et al. | 340/747 |
| 4,369,439 | 1/1983 | Broos | 340/706 |

FOREIGN PATENT DOCUMENTS

WO82/3712  10/1982  PCT Int'l Appl. ............... 340/709

Primary Examiner—Donald J. Yusko
Assistant Examiner—Alvin Oberley
Attorney, Agent, or Firm—James T. Comfort; Leo N. Heiting; Melvin Sharp

[57] ABSTRACT

A cursor control system for computer displays moves a cursor unambiguously in three dimensions using a two dimensional input device. The plane of movement of the two dimensional device is divided into logical regions which correspond to movement along a three dimensional axis. Movement of the two dimensional device into one of these regions causes the cursor to move along the corresponding axis of the display.

7 Claims, 2 Drawing Sheets

CURSOR CONTROL SYSTEM

This application is a continuation of application Ser. No. 814,854 filed Dec. 30, 1985, now abandoned.

BACKGROUND AND SUMMARY OF THE INVENTION

The present invention relates generally to computer systems, and more specifically to a system for controlling cursor movement on a computer display screen.

Graphical computer displays are very helpful in interpreting many types of information which could otherwise be difficult to understand. With the advent of bit-mapped graphics capabilities, high quality computer graphics displays are becoming common. Automated design systems, data interpretation systems, and the like can be operated by displaying graphs or drawings on a computer screen, and a user can make changes or inquiries by moving a pointing device around on the display.

A user can point to objects or locations on the graphics display by moving a pointer, often referred to as a cursor, on the screen. This is often done by physically moving an optical or mechanical device such as a mouse, joystick or trackball. Movement of the physical device is detected by the computer system, and the cursor is moved on the display in a corresponding manner.

In many cases, the computer displays are representations of three-dimensional objects or data. What is shown on the display is actually a two dimensional projection of a three-dimensional structure stored within the computer system. When it is desired to point at various parts of the three-dimensional structure being displayed, it is necessary to move the cursor in three dimensions. In many applications, the mapping of two dimensional movements of the physical positioning device onto the two dimensional display gives ambigious information as to the three dimensional location of the cursor. Thus, there must be some method for entering physical cursor movement information so that the display system can detect motion in three dimensions, typically an X, Y, Z coordinate system.

Currently, three dimensional cursor movement control is provided by entering three separate signals into display system. These symbols may be generated, for example, by separate X, Y and Z controls, or a control indicating motion in a plane, such as a mouse or joystick, augmented by a separate control for the third dimension. Therefore, mouse movement can be used to indicate position in the X-Y plane, with a separate dial control indicating movement along the Z axis.

It would be desirable to control three-dimensional cursor movement using a standard two-dimensional physical control device which is familar to computer system users. It would also be desirable for such a control device to be used for unambiguous three dimensional cursor movement in such a manner that the correspondence between movements of the physical device and the cursor on the display screen is intuitively natural.

It is therefore an object of the present invention to provide a two-dimensional physical input device which allows three-dimensional cursor control on a computer display.

Therefore, according to the present invention, a two-dimensional physical input device provides an input signal to an interpreter for a computer display system. The interpreter system logically divides the plane of movement into six regions which correspond to movement in the positive and negative directions along the three coordinate axes. These regions are positioned so that movement of the input device in a direction which approximates the angle of a major axis as shown on a computer display causes cursor movement along that axis.

The novel features which characterize the present invention are defined by the appended claims. The foregoing and other objects and advantages of the present invention will hereafter appear, and for purposes of illustration, but not of limitation, a preferred embodiment is shown in the accompanying drawings.

DESCRIPTION OF THE PREFERRED EMBODIMENT

Figure 1:
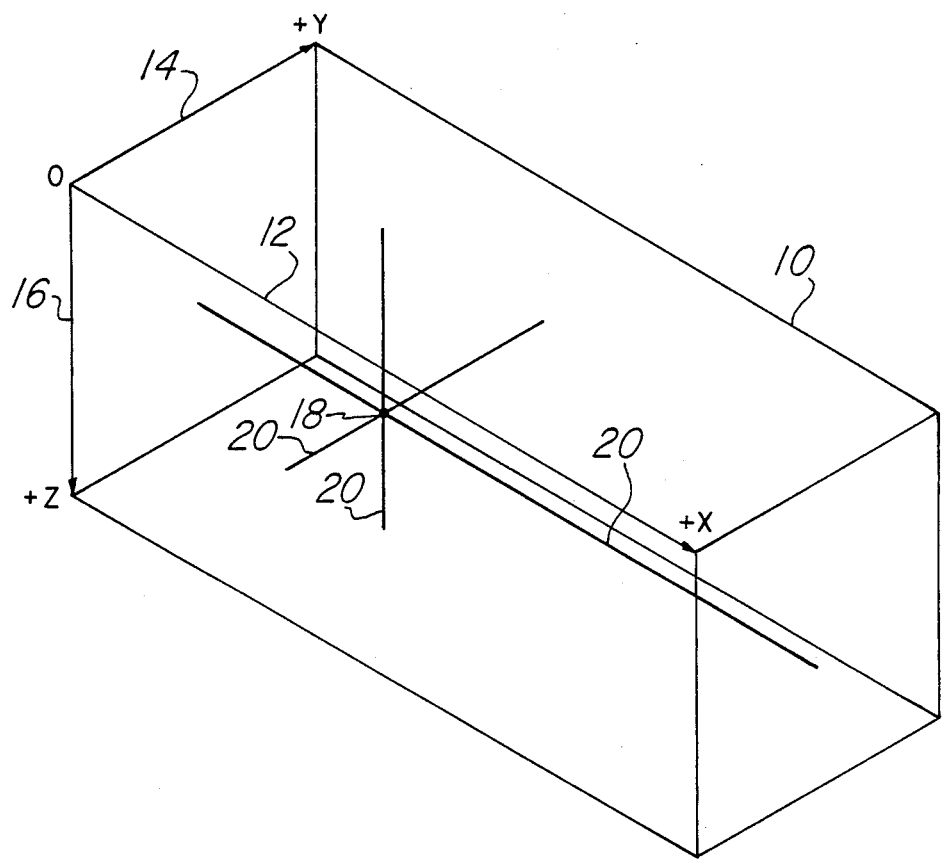
FIG. 1 is a view of a three-dimensional structure as displayed on a twodimensional computer display.

A simplified drawing of a three-dimensional structure that can be displayed on a computer display system is shown in FIG. 1. This structure is simplified to show a simple rectangular parallelpiped 10, although in actual use a displayed object or data structure would usually be more complex. In FIG. 1, the origin of a rectangular coordinate system is the upper left front corner of the parallelpiped 10, with the X direction extending to the right along edge 12, the Y direction extending up and to the rear along edge 14, and the Z direction extending downwardly along edge 16. Also shown in FIG. 1 is a cursor 18 located within the parallelpiped. Three cross hairs 20 pass through the cursor 18 in directions parallel to the three coordinate axes, and terminate on the walls of the parallelpiped 10. This assists the user in unambiguously locating the cursor 18 within the three dimensional object.

For the use manipulating the system, the intuitive way of moving along the X axis is to move down and to the right for the positive direction, and up and to the left for the negative direction. This is a direction which tracks the apparent direction of the coordinate axis. Movement of the pointing device which tracks this intuitively natural motion would be easy to use.

Figure 2:
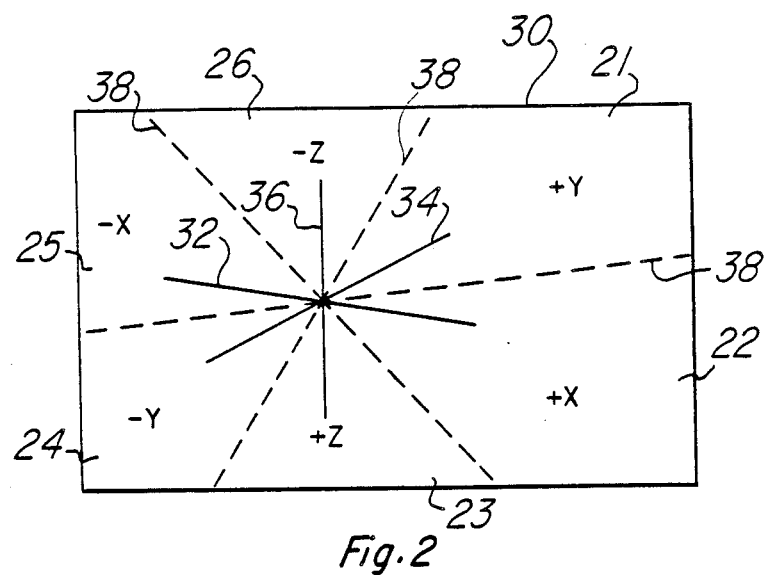
FIG. 2 is a diagram showing logical division of the movement plane of a physical device into six logical regions.

Referring to FIG. 2, a flat surface 30 is divided into a plurality of regions 21, 22, 23, 24, 25, 26. This flat surface can be, for example, a surface upon which a mouse is moved. Drawn on the surface 30 are lines 32, 34, 36, which represent respectively the two-dimensional projection of the X, Y and Z axes shown in FIG. 1. The angles between the projected axes 32, 34, 36 are bisected by dashed lines 38. The regions 21, 22, 23 24, 25, 26 defined by the dashed lines 38 are named to correspond to the direction of movement along the axis enclosed within the region.

The lines 32, 34, 36, 38 drawn on the surface 30 are not actually drawn on the movement surface of the mouse. These are merely logical regions, defined by an interpreter in the system, into which a mouse located at the intersection point may move.

The mouse is initially considered to be located at the intersection o the three axes 32, 34, 36. When the mouse is moved, a scanner in the system senses the motion and calculates its direction as is well known in the art. An interpreter in the system then calculates into which logical region the mouse has moved. The interpreter then causes the cursor 18 to be moved along the axis corresponding to the region into which the mouse has moved. Thus, for example, if the user wishes to move the cursor of FIG. 1 in the positive Y direction, he moves the mouse up and to the right in a single motion taking it into the +Y region 21. Slight inaccuracies in tracking the precise angle of the axis are not important because any movement into the +Y region 21 will translate into movement into the +Y direction only. Thus, movement of the two-dimensional mouse in a direction corresponding approximately to the direction of the two dimensional projection 34 of the three dimensional structure causes three-dimensional movement along that axis. As the cursor 18 moves, the cross hairs 20 are also moved to indicate its new position.

As stated above, the lines 32, 34, 36, 38 drawn on the surface 30 are only logical artifacts of the interpreter and do not actually exist on the surface 30. At all times, the interpreter considers the mouse to be currently residing at the intersection point of the axes. Thus, movement from the current position to a new position will be in the direction of one of the six regions 21-26, and the interpreter will cause the cursor 18 to be appropriately moved on the display.

Figure 3:
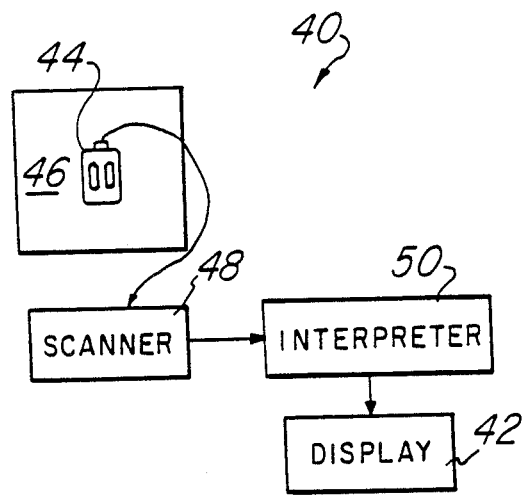
FIG. 3 is a block diagram showing a cursor control system according to the present invention.

Referring to FIG. 3, a block diagram of the system 40 is shown. A display device 42 includes the physical display unit, such as the CRT, along with the hardware and software necessary to drive it, such as the central processor, memory, video drivers and operating system. This hardware and software is common in computer systems, and is well known in the art. As used herein, the term display is intended to include all of the computer system other than an interpreter, scanner and mouse as described below. A mouse device 44 is physically moved about on a plane 46. The mouse device is connected to a scanner 48 which is a standard part of computer systems incorporating mouse devices as pointers. The scanner 48 reads electrical or optical signals from the mouse 44 and determines the two dimensional components of the direction in which the mouse 44 is moving. This information is sent to the interpreter 50, which decides into which logical region 2-26 the mouse 44 is moving, and sends signals to the display unit 42 causing the cursor 18 to be moved as described above.

The interpreter 50 may be implemented in hardware in a computer system, or may be primarily a software implementation. The calculations undertaken by the interpreter 50 are actually very simple. It must merely take the mouse movement information from the scanner 48, compute the angle of movement, and compare it with an internal storage table indicating which range of angles corresponds to movement along which axis. The two dimensional projection of this three dimensional movement is then calculated in a known manner, and signals are sent to the appropriate display driven routines for repositioning the cursor 18 and the cross hairs 20.

Although a mouse 44 is used as the physical positioning device in the preferred embodiment, other pointing device which give two dimensional movement information, such as joysticks and trackballs, may be used.

Most graphics systems provide for changing the viewing angle at which the three dimensional graphical object 10 is viewed. Thus, the parallelpiped 10 can be rotated to be viewed from any direction. When this is done, it is necessary for the interpreter 50 to redefine the range of angles which correspond to movement along each axis. In other words, the directions of the projected axes 32, 34, 36 and the angles between them are changed.

If the three-dimensional object 10 is viewed directly along one axis, spatial information along that axis is lost and the object appears two-dimensional. Thus, the consideration of cursor movement on the display screen has degenerated into normal two dimensional planar movement. In the preferred embodiment, the interpreter allows free movement of the cursor in this degenerate mode instead of restricting movement to be only along one axis at a time.

The interpreter 50 can be realized in many different ways. Attachment A is a program written in LISP for the Texas Instruments Explorer, illustrating one software driver for the interpreter. Many other software and hardware interpreters are of course possible.

TECHNICAL ADVANTAGES

The system described herein allows three-dimensional positioning of a cursor on a computer display screen by inherently natural movement of a two-dimensional pointer device such as a mouse. Thus, movement within three dimensions is greatly simplified and is easily implemented on all current standard graphics display systems.

The present invention has been illustrated by the embodiment described above, and it will become apparent to those skilled in the art that various modifications and alterations may be made thereto. Such variations fall within the spirit of the present invention, the scope of which is defined by the appended claims.

ATTACHMENT A

```
(defmethod (3d-cursor-mouse-handler :MOUSE-ENTERING) (&rest ignore)
   "When the mouse enters the window, reset parameters and display the
    cube and crosshairs."
   (setq Last-Wx nil Mean-Dx 0 Mean-Dy 0)
   (draw 3dd))

(defmethod (3d-cursor-mouse-handler :MOUSE-MOVING-INSIDE)
           (unused-window wx wy)
   "Whenever the mouse moves in the window, move the crosshairs in the
    appropriate direction."
   ;Make the (invisible) mouse blinker follow the mouse:
```

```
(tv:mouse-set-blinker-cursorpos)
;Erase old hairs:
(send self :draw-hairs)
;Compute the new endpoints of the hairs in 3-D coordinates:
(when (not (null Last-Wx))
   (setq Mean-Dx (// (+ (- wx Last-Wx) Mean-Dx) 2.0)
         Mean-Dy (// (+ (- wy Last-Wy) Mean-Dy) 2.0)
         Mean-Angle (atan Mean-Dy Mean-Dx))
   (send self :move-cursor-along-hair-closest-to-angle Mean-Angle))
;Compute the new endpoints of the hairs in the window:
(view-3dd 3dd)
(scale-3dd 3dd)
;Draw the hairs in their new positions:
(send self :draw-hairs)
(setq Last-Wx wx
      Last-Wy wy))

(defmethod (3d-cursor-mouse-handler :HAIR-WINDOW-ANGLE) (hair)
   "Returns the angle in the window of the axis corresponding to hair."
   (multiple-value-bind (wx1 wy1 wx2 wy2)
         (send self :hair-window-endpoints hair)
      (atan (- wy2 wy1) (- wx2 wx1))))

(defmethod (3d-cursor-mouse-handler :HAIR-WINDOW-ENDPOINTS) (hair)
   "Returns the endpoints of the hair in the window."
   (let ((wxyz (3dp-wxyz hair)))
      (values (first (first wxyz)) (second (first wxyz))
              (first (second wxyz)) (second (second wxyz)))))

(defmethod (3d-cursor-mouse-handler :HAIR-WORLD-ENDPOINTS) (hair)
   "Returns the endpoints of the hair in the coordinates of the 3-D
    cube."
   (let ((uxyz (3dp-uxyz hair)))
      (values (first (first uxyz))
              (second (first uxyz))
              (third (first uxyz))
              (first (second uxyz))
              (second (second uxyz))
              (third (second uxyz)))))

(defmethod (3d-cursor-mouse-handler :DRAW-HAIRS) ()
   "Draws the hairs in the window."
   (draw-3dp X-Hair 3dd)
   (draw-3dp Y-Hair 3dd)
   (draw-3dp Z-Hair 3dd))

(defmethod (3d-cursor-mouse-handler
              :MOVE-CURSOR-ALONG-HAIR-CLOSEST-TO-ANGLE) (angle)
   "Decides which axis the mouse is moving along, and moves the cursor
    along that axis."
   (let ((x+ (angle-difference X-Angle angle))
         (x- (angle-difference
                 (+ X-Angle (if (> X-Angle pi) (- pi) pi)) angle))
         (y+ (angle-difference Y-Angle angle))
         (y- (angle-difference
                 (+ Y-Angle (if (> Y-Angle pi) (- pi) pi)) angle))
         (z+ (angle-difference Z-Angle angle))
         (z- (angle-difference
                 (+ Z-Angle (if (> Z-Angle pi) (- pi) pi)) angle)))
      (let ((minimum-difference (min x+ x- y+ y- z+ z-)))
         (selector minimum-difference =
            (x+ (send self :move-cursor  1  0  0))
            (x- (send self :move-cursor -1  0  0))
```

```
      (y+ (send self :move-cursor  0  1  0))
      (y- (send self :move-cursor  0 -1  0))
      (z+ (send self :move-cursor  0  0  1))
      (z- (send self :move-cursor  0  0 -1)))))))

(defflavor 3D-CURSOR-MOUSE-HANDLER
   ((Window nil)      ;Window in which the cursor is displayed.
    (3dd nil)         ;3-D Display representation of cube and crosshairs.
    (X-Hair nil)      ;The X, Y, and Z crosshair objects (from 3dd).
    (Y-Hair nil)
    (Z-Hair nil)
    (X-Angle nil)     ;Angle in Window of the X, Y, and Z axes.
    (Y-Angle nil)
    (Z-Angle nil)
    (Last-Wx nil)     ;The previous mouse position in window.
    (Last-Wy nil)
    (Mean-Dx 0)       ;Approximate average of recent mouse displacements.
    (Mean-Dy 0)
    (Mean-Angle 0)    ;Angle of the (averaged) recent mouse displacement.
    (Sx 0.1)          ;How far the cursor moves in the cube when the mouse
    (Sy 0.1)          ; is moved parallel to the x, y, or z axis.
    (Sz 0.1))
   (mouse:io-buffer-stuffing-mouse-handler)
   :settable-instance-variables
   (:init-keywords :view-vector)
   (:default-init-plist :view-vector '(-1 2 -0.5))
   (:documentation
     "A mouse handler that controls a 3-D cursor.  Window is a required
      Init Option.  Displays a wire-frame cube in the window, with 3-D
      crosshairs initially positioned at the center of the cube.  When
      the mouse is moved in the window approximately parallel to the
      projection of an axis of the cube, the 3-D crosshairs cursor moves
      along that axis in the appropriate direction."))

(defmethod (3d-cursor-mouse-handler :AFTER :INIT) (init-options)
   "Creates a wire-frame cube drawing with the mouse cursor positioned
    in the center.  Also initializes constants to help speed cursor
    control."
   (setq 3dd (imagine :curves (3dd-box-edges -1 1 -1 1 -1 1)
                     :window Window
                     :view-vector (get init-options :view-vector)
                     :hidden-line-elimination-p nil
                     :3d-display))
   (imagine :in :curves (3dd-xyz-axes -1 1 -1 1 -1 1))

(view-3dd 3dd)
   (scale-3dd 3dd)
   ;Force XOR drawing:
   (loop for 3dp in (3dd-3dps 3dd) do (alter-3dp 3dp color -1))
   (setq X-Hair (first (3dd-3dps 3dd))
         Y-Hair (second (3dd-3dps 3dd))
         Z-Hair (third (3dd-3dps 3dd))
         X-Angle (send self :hair-window-angle X-Hair)
         Y-Angle (send self :hair-window-angle Y-Hair)
         Z-Angle (send self :hair-window-angle Z-Hair)
         Mouse:Mouse-Blinker-Definition   ;Invisible mouse.
            '(:character 0 0 :on :set-character 160 fonts:mouse)
         Mouse:Who-Line-Documentation
            "Move mouse parallel to an axis to move 3-D cursor."))
```

```
(defun ANGLE-DIFFERENCE (al a2)
  "Returns the difference between Al and A2, guaranteeing that the
   result lies in [0,pi) when Al and A2 lie in [0,2*pi)."
  (let ((difference (abs (- al a2))))
    (if (> difference pi)
        (- (* 2 pi) difference)
      difference)))

(defmethod (3d-cursor-mouse-handler :MOVE-CURSOR) (dx dy dz)
  "Modifies crosshairs object(s) as needed to represent movement in
   the (DX,DY,DZ) direction."
  (setq dx (* Sx dx)
        dy (* Sy dy)
        dz (* Sz dz))
  (when (not (zerop dx))
    (send self :move-cursor-along-hair Y-Hair dx 0 0)
    (send self :move-cursor-along-hair Z-Hair dx 0 0))
  (when (not (zerop dy))
    (send self :move-cursor-along-hair X-Hair 0 dy 0)
    (send self :move-cursor-along-hair Z-Hair 0 dy 0))
  (when (not (zerop dz))
    (send self :move-cursor-along-hair X-Hair 0 0 dz)
    (send self :move-cursor-along-hair Y-Hair 0 0 dz)))

(defmethod (3d-cursor-mouse-handler :MOVE-CURSOR-ALONG-HAIR)
           (hair dx dy dz)
  "Modifies the crosshairs object, HAIR, to represent movement in
   the (DX,DY,DZ) direction."
  (multiple-value-bind (x1 y1 z1 x2 y2 z2)
      (send self :hair-world-endpoints hair)
    (alter-3dp hair uxyz
      (list (list (max -1 (min 1 (+ x1 dx)))
                  (max -1 (min 1 (+ y1 dy)))
                  (max -1 (min 1 (+ z1 dz))))
            (list (max -1 (min 1 (+ x2 dx)))
                  (max -1 (min 1 (+ y2 dy)))
                  (max -1 (min 1 (+ z2 dz))))))))
```

What is claimed is:

1. A computer system showing a two dimensional projection of a three dimensional structure comprising:
   (a) a display device for displaying a two dimensional projection of a three dimensional structure; and
   (b) means for controlling motion of a cursor within said three dimensional structure, comprising:
   (c) a fixed surface having plural defined regions thereon, each said region uniquely defining one of said three dimensions;
   (d) an input device capable of moving in two dimensions positionable over said fixed surface and movable thereon into each said region;
   (e) a scanner coupled to said input device to provide a signal indicative of the distance and direction of movement of said input device on said surface; and
   (f) an interpreter coupled to said display device and to said scanner and responsive to said signal indicative of input device movement over a said region of said fixed surface to define the dimension corresponding to the said region to translate said movement of said input device into three dimensional motion within the structure by the interpreter, and translate movement of said input device into motion of the cursor in the corresponding selected direction within the three dimensional structure.

2. The system of claim 1, said scanner further providing the function of detecting the speed of said input device movement, and said interpreter providing the function of translating the speed of motion of the input device to speed of motion within the three dimensional structure.

3. The computer system of claim 1, wherein said surface is planar; and said input device includes a hand-held body coupled to said scanner and adapted for movement on said planar surface, wherein signals are generated which indicate the direction of motion of said hand-held body relative to said planar surface.

4. The computer system of claim 3, wherein said interpreter divides two dimensional space into six regions corresponding to six directions of movement of said hand-held body on said planar surface from an origin.

5. A method for interpreting motion of a two dimensional input device to unambiguously position a cursor in a two dimensional display of a three dimensional structure, comprising the steps of:
   (a) providing a display device for displaying a two dimensional projection of a three dimensional structure; and (b) controlling motion of a cursor within said three dimensional structure, comprising the steps of:

(c) providing a fixed surface having plural defined regions thereon, each said region uniquely defining one of said three dimensions;

(d) moving an input device in two dimensions over said fixed surface into a selected one of said regions;

(e) providing a signal indicative of the distance and direction of movement of said input device on said surface; and (f) defining the dimension corresponding to the said region to translate said movement of said input device into one dimensional motion within the structure along said dimension to translate movement of said input device into motion of the cursor in the corresponding selected direction within the three dimensional structure.

6. The method of claim 3, further comprising the step of:

(g) during step (f) determining the rate of motion of the input device, step (f) further comprising moving the cursor along said dimension at a rate proportional to the rate determined in step (g).

7. The method of claim 5 wherein said movement in step (d) is substantially linear.

* * * * *